US008067076B2

(12) United States Patent
Lubin et al.

(10) Patent No.: US 8,067,076 B2
(45) Date of Patent: Nov. 29, 2011

(54) DUPLEX CAPABLE PAPER BACKED TRANSPARENCIES

(75) Inventors: Dara N. Lubin, Pittsford, NY (US); Charles Bennett, Hilton, NY (US); Victoria Warner, Caledonia, NY (US); Barbara Ferguson, Keuka Park, NY (US); Robert Dengler, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 314 days.

(21) Appl. No.: 11/840,047

(22) Filed: Aug. 16, 2007

(65) Prior Publication Data

US 2009/0047457 A1   Feb. 19, 2009

(51) Int. Cl.
*B32B 9/00*     (2006.01)
*B32B 23/02*    (2006.01)
*B32B 27/14*    (2006.01)
*B41M 5/00*     (2006.01)

(52) U.S. Cl. ... 428/40.1; 428/42.1; 428/192; 428/195.1; 428/198

(58) Field of Classification Search ............... 428/40.1, 428/42.1, 103, 192, 195.1, 198
See application file for complete search history.

(56) References Cited

U.S. PATENT DOCUMENTS

| 3,618,752 | A | * | 11/1971 | Barker et al. | 206/455 |
| 4,814,216 | A | * | 3/1989 | Brunett et al. | 428/43 |
| 4,980,212 | A | * | 12/1990 | Marquis et al. | 428/40.1 |
| 5,200,242 | A | * | 4/1993 | Hohmann | 428/32.13 |
| 5,326,617 | A | * | 7/1994 | Wright et al. | 428/136 |

* cited by examiner

*Primary Examiner* — Patricia Nordmeyer
(74) *Attorney, Agent, or Firm* — MH2 Technology Law Group LLP

(57) ABSTRACT

A paper backed transparency includes a transparency, a paper backing for the transparency and a first adhesive along a leading edge of the paper backed transparency. A second adhesive along a trailing edge of the paper backed transparency is disclosed to limit movement between the transparency and the paper backing during duplexing.

18 Claims, 5 Drawing Sheets

DUPLEX CAPABLE PAPER BACKED TRANSPARENCIES

FIELD

The subject matter of the teachings disclosed herein relates to paper backed transparencies. More particularly, the subject matter of the teachings disclosed herein relates paper backed transparencies that can be used with a mechanical duplexer.

BACKGROUND

Because of sensors used in copying or printing equipment to detect the medium being imaged, a paper must be attached to a transparency before the transparency can be used with copying or printing equipment. However, conventional paper backed transparencies are only designed to be used with single sided copying or printing equipment.

Conventional paper backed transparencies are adhered at one edge only, typically on the lead edge when placed in a sheet-fed printing device. Because conventional paper backed transparencies are adhered on one edge only, the paper backed transparencies cannot be fed through a mechanical duplex paper path. The duplex paper path cannot transport the paper backed transparencies successfully in inverting transports.

The paper backing on the conventional paper backed transparencies separates from the transparency and jam during transport within a printing duplex transport mechanism. Conventional paper backed transparencies allow for relative motion between the plastic transparency and the paper backing sheet. The relative motion at the trailing edge causes unsatisfactory wrinkling in the paper path nips and fuser, leading to image disturbances.

FIG. 1 shows a conventional paper backed transparency 100.

In particular, FIG. 1 shows a conventional paper backed transparency 100 that includes a transparency 110, a paper backing 120 and an adhesive strip 130. The transparency 110 is attached to the paper backing 120 at the leading edge 140 of the conventional paper backed transparency 100 with the adhesive strip 130. The adhesive strip 130 allows for easy separation of the transparency 110 from the paper backing 120 without damaging the transparency 110.

Conventionally, the paper backing 120 is not imaged and thus serves no purpose post imaging of the transparency 110. The paper backing 120 is conventionally peeled away from the transparency 110 and discarded.

During transport in a single sided copying or printing transport mechanism, the conventional paper backed transparency 100 is not subjected to the movements through the copying or printing transport mechanism that a paper is subjected to during duplexing. Thus, the conventional paper backed transparency 100 is adequate for use with a conventional copying or printing transport mechanism. However, when the conventional paper backed transparency 100 is used with a duplexing copying or printing transport mechanism the conventional paper backed transparency 100 allows for relative motion at the trailing edge 160 between the transparency 110 and the paper backing 120. The relative motion at the trailing edge 160 between the transparency 110 and the paper backing 120 causes unsatisfactory wrinkling in the paper path nips and fuser, leading to image disturbances.

Accordingly, the present teachings solve these and other problems of the prior art's conventional paper backed transparencies.

SUMMARY

In accordance with the teachings, a paper backed transparency is disclosed that includes a transparency, a paper backing for the transparency and a first adhesive along the leading edge of the paper backed transparency. A second adhesive along the trailing edge of the paper backed transparency is disclosed to limit movement between the transparency and the paper backing.

In accordance with the teachings, a method of adhering a paper backed transparency is disclosed that includes providing a transparency, providing a paper backing for the transparency and adhering the paper backed transparency along the leading edge of the paper backed transparency. The paper backed transparency is adhered along the trailing edge of the paper backed transparency to limit movement between the transparency and the paper backing.

Additional advantages of the embodiments will be set forth in part in the description which follows, and in part will be obvious from the description, or may be learned by practice of the teachings. The advantages will be realized and attained by means of the elements and combinations particularly pointed out in the appended claims.

It is to be understood that both the foregoing general description and the following detailed description are exemplary and explanatory only and are not restrictive of the teachings, as claimed.

The accompanying drawings, which are incorporated in and constitute a part of this specification, illustrate embodiments of the teachings and together with the description, serve to explain the principles of the teachings.

DESCRIPTION OF THE EMBODIMENTS

Reference will now be made in detail to the present embodiments, examples of which are illustrated in the accompanying drawings. Wherever possible, the same reference numbers will be used throughout the drawings to refer to the same or like parts.

To overcome the problems associated with using a conventional paper backed transparency 100 with a duplexing copying or printing transport mechanism, the teachings disclosed herein provide for adhesive at additional points between the transparency 110 and the paper backing 120. The novel paper backed transparency disclosed herein includes adhesive along the trailing edge of a paper backed transparency between the transparency 110 and the paper backing 120. The adhesive at the trailing edge of the paper backed transparency between the transparency 110 and the paper backing 120 limits movement between the transparency 110 and the paper backing 120 and prevents the trailing edge of the transparency 110 and the paper backing 120 from separating during duplexing.

Thus, instead of conventionally discarding the paper backing 120 because the paper backing 120 is conventionally not imaged, the novel paper backed transparency disclosed herein allows for imaging of both the transparency 110 and the paper backing 120. Imaging of both the transparency 110 and the paper backing 120 allows for novel uses of a paper backed transparency such as, e.g., imaging a transparency for overhead use and imaging notes associated with the transparency on the paper backing 120.

Moreover, the novel paper backed transparency disclosed herein eliminates waste associated with conventional discard of the paper backing from a paper backed transparency.

Figure 1:
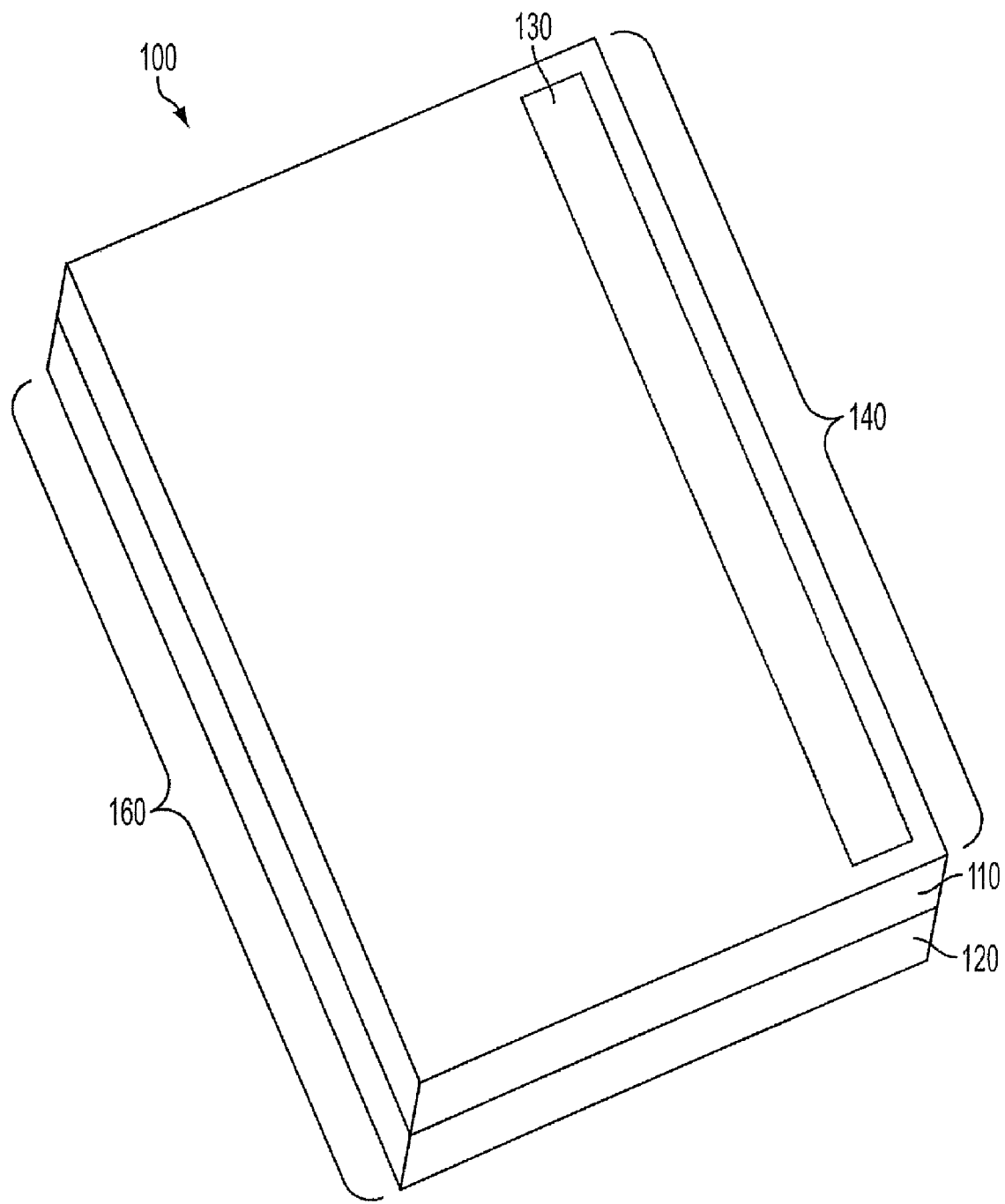
FIG. 1 shows a conventional paper backed transparency.
Figure 2:
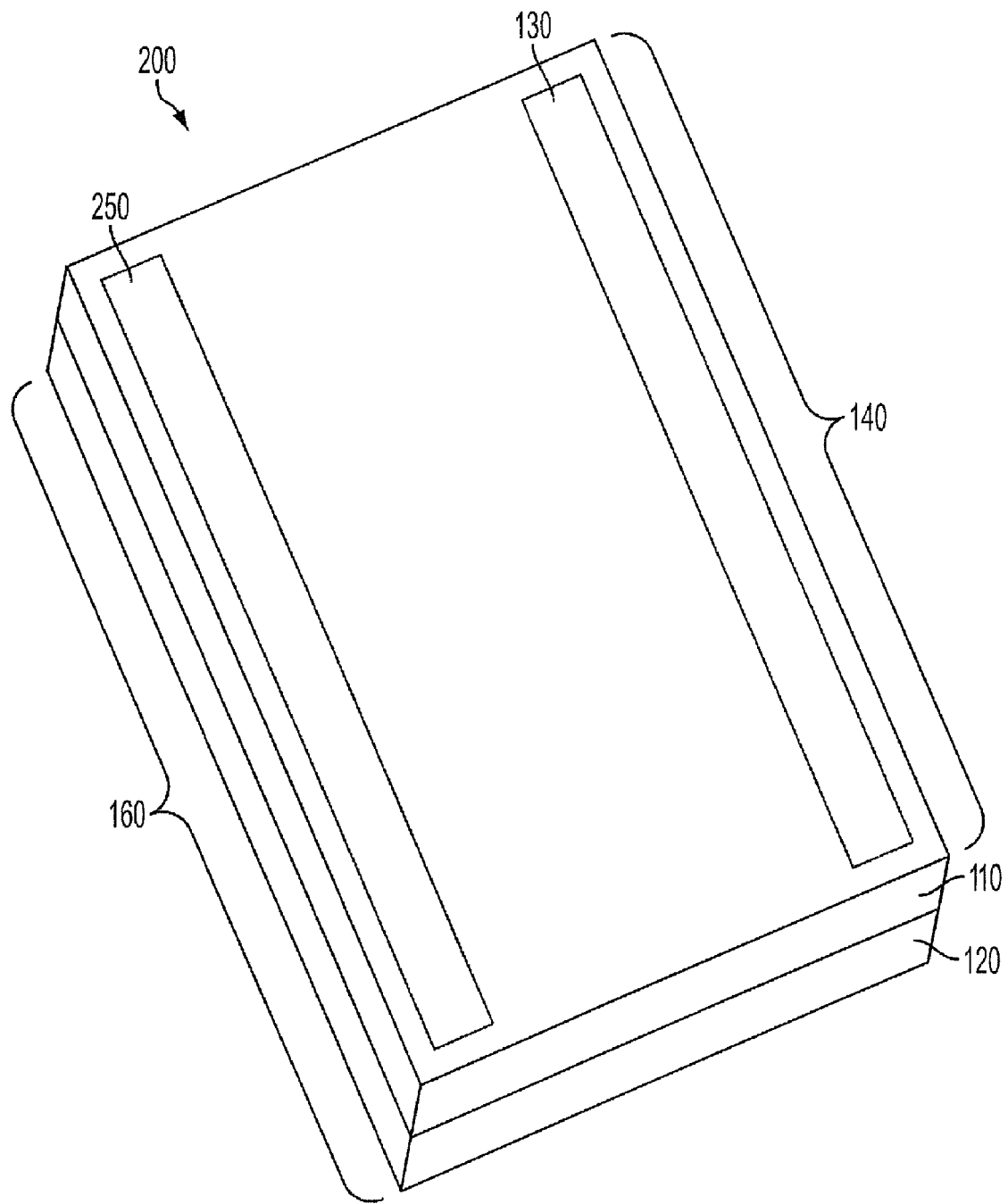
FIG. 2 shows a paper backed transparency, in accordance with the principles of the present teachings.

FIG. 2 shows a paper backed transparency 200, in accordance with the principles of the present teachings. It should be readily apparent to those of ordinary skill in the art that the paper backed transparency 200 shown in FIG. 2 represents a generalized system illustration and that other components can be added or existing components can be removed or modified while still remaining within the spirit and scope of the present teachings.

In particular, FIG. 2 shows a paper backed transparency 200 that includes a transparency 110, a paper backing 120 and a first adhesive strip 130. The transparency 110 can be attached to the paper backing 120 at the leading edge 140 of the paper backed transparency 200 with the first adhesive strip 130. However, to allow the paper back transparency 200 to be used with a duplexing mechanism the paper backed transparency 200 can further include a second adhesive strip 250 along the trailing edge 160 of the paper backed transparency 200. The first adhesive strip 130 and the second adhesive strip can be, e.g., solid adhesive strips along the leading edge 140 of the paper backed transparency 200 and along the trailing edge 160 of the paper backed transparency 200.

The use of the first adhesive strip 130 and the second adhesive strip 250 still allows for some movement between the transparency 110 and the paper backing 120. Some movement between the transparency 110 and the paper backing 120 is necessary because the transparency 110 slightly shrinks during imaging of the transparency 110. Adhesion of too great an area between the transparency 110 and the paper backing 120 prevents the transparency 110 from independently changing area, which would cause wrinkling across the surface of the transparency 110. Wrinkling across the transparency 110 prevents an image from being properly applied to the transparency 110.

Figure 3:
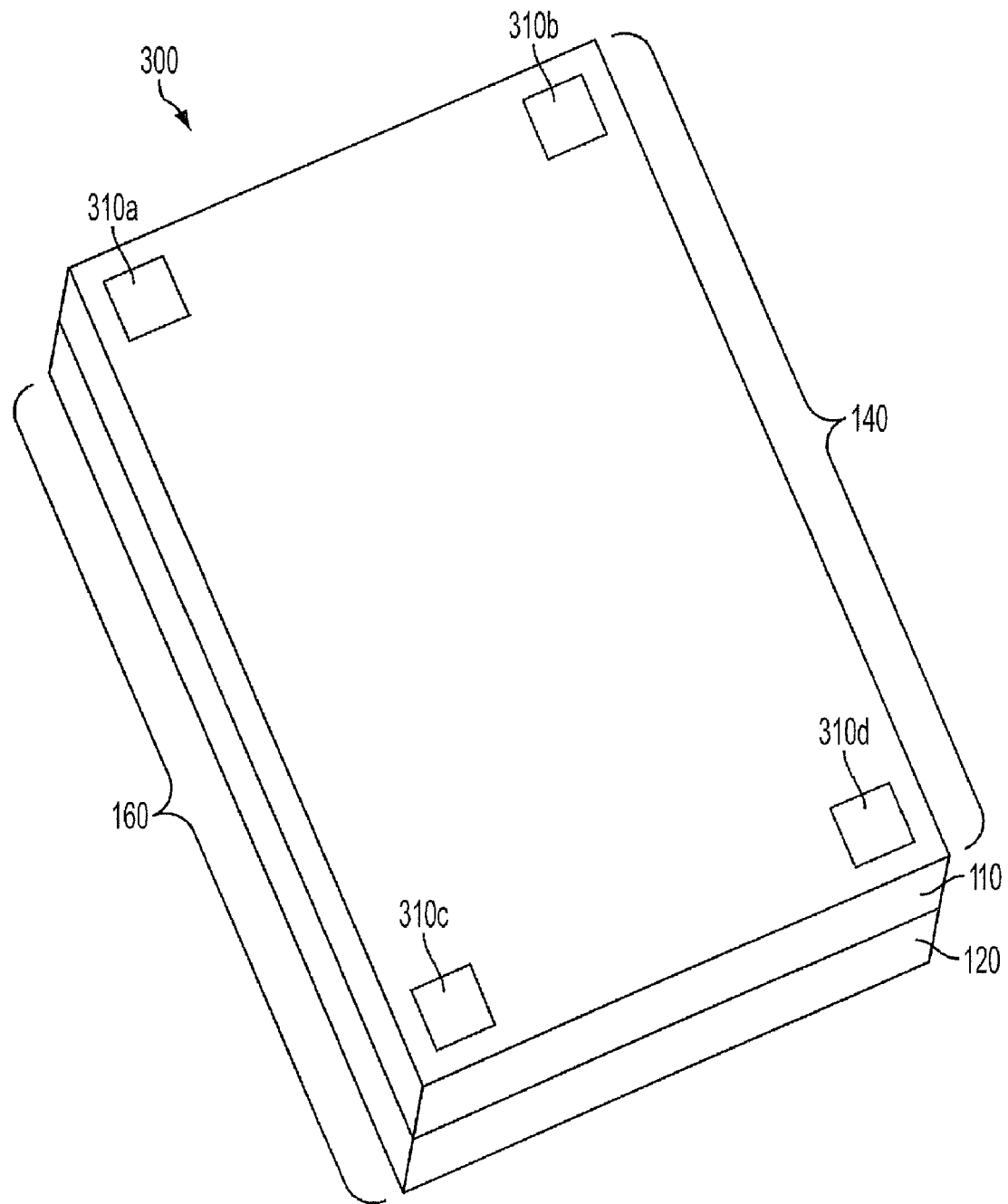
FIG. 3 shows another paper backed transparency, in accordance with the principles of the present teachings.

FIG. 3 shows a paper backed transparency 300, in accordance with the principles of the present teachings. It should be readily apparent to those of ordinary skill in the art that the paper backed transparency 300 shown in FIG. 3 represents a generalized system illustration and that other components can be added or existing components can be removed or modified while still remaining within the spirit and scope of the present teachings.

In particular, FIG. 3 shows a paper backed transparency 300 that includes a transparency 110, a paper backing 120 and adhesive blocks 310a-310d. The transparency 110 can be attached to the paper backing 120 at the leading edge 140 of the paper backed transparency 300 with the adhesive blocks 310b and 310d. However, to allow the paper back transparency 300 to be used with a duplexing mechanism the paper backed transparency 300 can further include adhesive blocks 310a and 310c along the trailing edge 160 of the paper backed transparency 300.

Paper backed transparency 300 has an advantage over paper backed transparency 200 of requiring less adhesive. However, paper backed transparency 300 has a disadvantage over paper backed transparency 200 of allowing more movement between the transparency 110 and the paper backing 120 at the leading edge 140 and the trailing edge 160. To reduce the amount of movement between the transparency 110 and the paper backing 120 at the leading edge 140 and the trailing edge 160 the adhesive blocks 310a-310d can represent rectangular blocks that respectfully extended along the leading edge 140 and the trailing edge 160 to decrease movement at the leading edge 140 and the trailing edge 160. The size of the adhesive blocks, i.e., the height and width, can be any size that limits movement between the transparency 110 and the paper backing 120.

Figure 4:
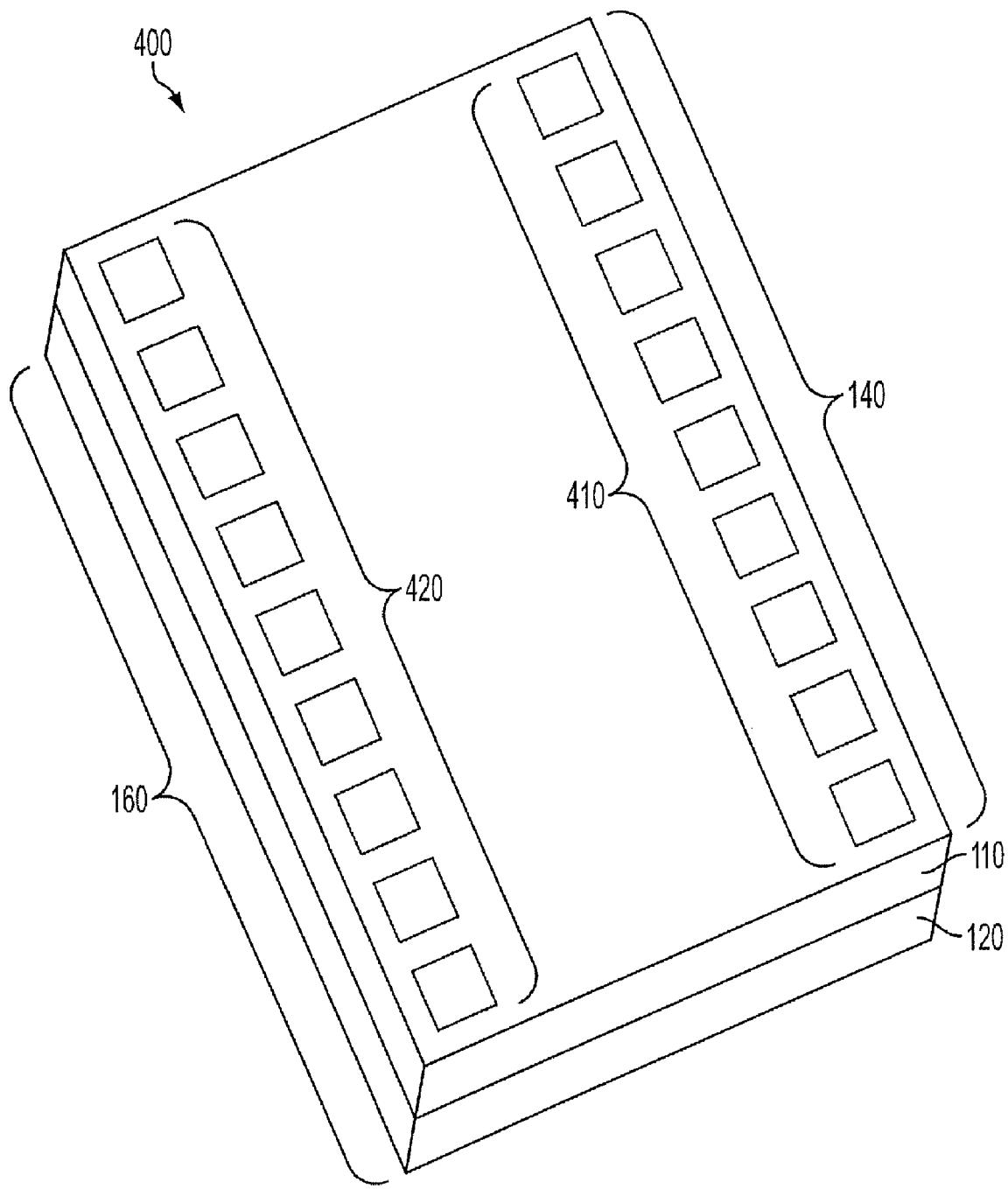
FIG. 4 shows another paper backed transparency, in accordance with the principles of the present teachings.

FIG. 4 shows a paper backed transparency 400, in accordance with the principles of the present teachings. It should be readily apparent to those of ordinary skill in the art that the paper backed transparency 400 shown in FIG. 4 represents a generalized system illustration and that other components can be added or existing components can be removed or modified while still remaining within the spirit and scope of the present teachings.

In particular, FIG. 4 shows a paper backed transparency 400 that includes a transparency 110, a paper backing 120, a first dotted adhesive strip 410, and a second dotted adhesive strip 420. The transparency 110 can be attached to the paper backing 120 at the leading edge 140 of the paper backed transparency 400 with the first dotted adhesive strip 410. The transparency 110 can be attached to the paper backing 120 at the trailing edge 160 of the paper backed transparency 400 with the second dotted adhesive strip 420.

The spaces in the alternating adhesive and spaces within the dotted adhesive strips 410 and 420 can be made large enough to minimize the amount of adhesive required to hold the transparency 110 and the paper backing 120 together while preventing the transparency 110 and the paper backing 120 from separating during transport through a duplexing mechanism. The size of the spaces in the dotted adhesive strips 410 and 420, i.e., the height and width, can be any size that limits movement between the transparency 110 and the paper backing 120. Moreover, the size of the spaces in the dotted adhesive strip 410 can be different from the size of the spaces in the second dotted strip 420.

Figure 5:
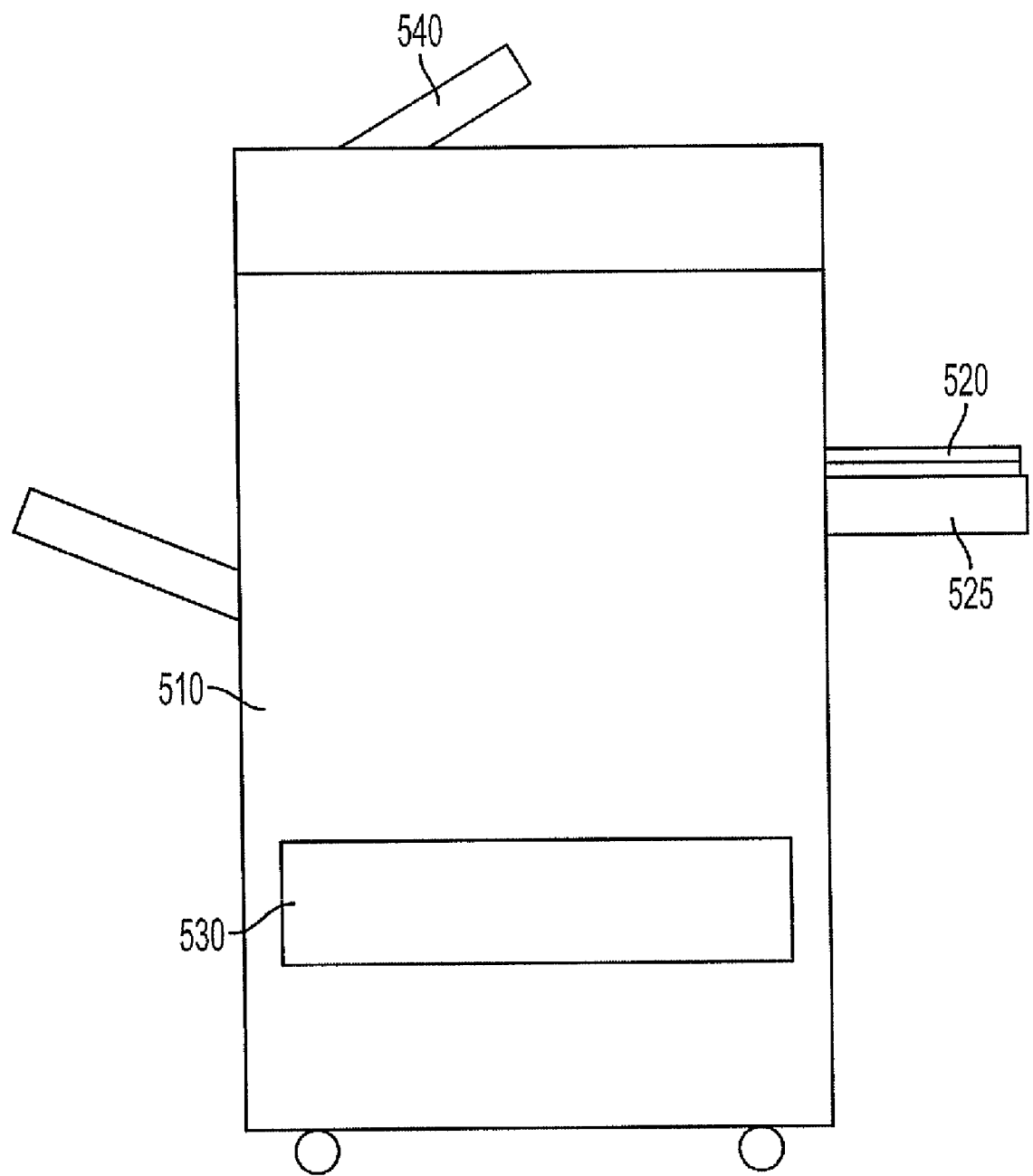
FIG. 5 shows a paper backed transparency being used with a duplexing copying or printing device, in accordance with the principles of the present teachings.

FIG. 5 shows a paper backed transparency 520 being used with a duplexing copying or printing device 510, in accordance with the principles of the present teachings.

In particular, FIG. 5 shows a duplexing copying or printing device 510. Any of the paper backed transparencies show in FIGS. 2-4, represented by paper backed transparency 520, can be fed into the duplexing copying or printing device 510 at a manual feed tray 525. Alternately, a stack of paper backed transparencies 520 can be placed in a copying or printing device drawer 530 for automated feeding of a paper backed transparency 520 through the duplexing copying or printing device 510.

As with conventional duplex imaging, original documents intending to be placed on an imaging medium, i.e., in accordance with the teachings disclosed herein a paper backed transparency 520, can be inserted into an automatic feeder 540. Using known methods within the art copying or printing techniques, the original documents are transferred to the paper backed transparency 520. However, in accordance with the principles disclosed herein the paper backed transparency 520 can be inverted, using known methods for inverting, within the duplexing copying or printing device 510 and the paper side 120 of the paper backed transparency 520 can be imaged. Thus, in accordance with the principles of the present invention, a duplexing copying or printing device 510 can be used to image both sides of a paper backed transparency 520.

The various adhesive strips and blocks shown in FIGS. 2-4 can be used in any combination that allows for proper adhesion along the leading edge 140 and trailing edge 160 of a paper backed adhesive. For example, the adhesive blocks 310a-310d from FIG. 3 can be used in combination with shortened dotted adhesive strips 410 and 420 near the center of the paper backed transparency from FIG. 4. For another example, the leading edge 140 can use the adhesive blocks 310b and 310d, while the trailing edge 160 can use the dotted adhesive strip 420. Any combination of adhesive along the leading edge 140 and trailing edge 160 taught in FIGS. 2-4 is within the spirit and scope of the teachings.

Thus, the teachings disclosed herein can use an adhesive at both a leading edge and a trailing edge of a paper backed transparency to limit the amount of movement between a transparency and a paper backing for the transparency that allows the paper backed transparency to be used with a mechanical duplexer. Moreover, the teachings disclosed herein of using an adhesive at both a lead edge and a trail edge of a paper backed transparency that reduces wrinkling. Moreover, the teachings disclosed herein provide a novel use for the paper on a paper backed transparency that is conventionally discarded.

While the teachings disclosed herein has been illustrated with respect to one or more implementations, alterations and/or modifications can be made to the illustrated examples without departing from the spirit and scope of the appended claims. In addition, while a particular feature of the teachings disclosed herein may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the teachings disclosed herein will be apparent to those skilled in the art from consideration of the specification and practice of the teachings disclosed herein. It is intended that the specification and examples be considered as exemplary only, with a true scope and spirit of the teachings disclosed herein being indicated by the following claims.

What is claimed is:

1. A paper backed transparency configured for transport through a duplexing mechanism, the paper backed transparency comprising:
    a paper backing comprising a first top surface and a first bottom surface;
    a transparency comprising a second top surface and a second bottom surface, wherein second the bottom surface is entirely removably adhered to the first top surface of the paper backing;
    a first adhesive positioned between the first top surface of the paper backing and the second bottom surface of the transparency and only along a leading edge of the paper backed transparency; and a second adhesive positioned between the first top surface of the paper backing and the second bottom surface of the transparency and only along a trailing edge of the paper backed transparency, the first and second adhesive configured to limit movement between the transparency and the paper backing and allow the paper backed transparency to be inverted by the duplexing mechanism such that the first bottom surface of the paper backing and the second top surface of the transparency of the paper backed transparency can be printed on while preventing the transparency and paper backing from separating during transport through the duplexing mechanism.

2. The paper backed transparency according to claim 1, wherein the first adhesive is comprised of adhesive blocks positioned only at the corners of the paper backed transparency.

3. The paper backed transparency according to claim 1, wherein the first adhesive is comprised of a dotted adhesive strip.

4. The paper backed transparency according to claim 1, wherein the first adhesive is comprised of an adhesive strip.

5. The paper backed transparency according to claim 1, wherein the second adhesive is comprised of adhesive blocks positioned only at the corners of the paper backed transparency.

6. The paper backed transparency according to claim 1, wherein the second adhesive is comprised of a dotted adhesive strip.

7. The paper backed transparency according to claim 1, wherein the second adhesive is comprised of a solid adhesive strip.

8. A method of adhering a paper backed transparency configured for transport through a duplexing mechanism, the method comprising:
    providing a paper backing comprising a first top surface and a first bottom surface;
    providing a transparency comprising a second top surface and a second bottom surface, wherein second the bottom surface is entirely removably adhered to the first top surface of the paper backing;
    adhering the paper backing and transparency between the first top surface of the paper backing and the second bottom surface of the transparency and only along a leading edge of the paper backed transparency; and
    adhering the paper backing and transparency between the first top surface of the paper backing and the second bottom surface of the transparency and only along a trailing edge of the paper backed transparency, the first and second adhesive configured to limit movement between the transparency and the paper backing and allow the paper backed transparency to be inverted by the duplexing mechanism such that the first bottom surface of the paper backing and the second top surface of the transparency of the paper backed transparency can be printed on while preventing the transparency and paper backing from separating during transport through the duplexing mechanism.

9. The method according to claim 8, further comprising adhering the paper backed transparency along the leading edge of the paper backed transparency with adhesive blocks only at the corners of the paper backed transparency.

10. The method according to claim 8, further comprising adhering the paper backed transparency only along the leading edge of the paper backed transparency with a dotted adhesive strip.

11. The method according to claim 8, further comprising adhering the paper backed transparency only along the leading edge of the paper backed transparency with a solid adhesive strip.

12. The method according to claim 8, further comprising adhering the paper backed transparency only along the trailing edge of the paper backed transparency with adhesive blocks only at the corners of the paper backed transparency.

13. The method according to claim 8, further comprising adhering the paper backed transparency only along the trailing edge of the paper backed transparency with a dotted adhesive strip.

14. The method according to claim 8, further comprising adhering the paper backed transparency only along the trailing edge of the paper backed transparency with a solid adhesive strip.

15. A method of printing on a paper backed transparency, the paper backed transparency configured for transport through a duplexing mechanism, the method comprising:

imaging a top surface of a transparency side of the paper backed transparency, the paper backed transparency comprising a paper backing comprising a top surface and a bottom surface, a transparency entirely removably adhered at a bottom surface of the transparency and at a the top surface of the paper backing, first and second adhesive positioned only on a leading edge and trailing edge of the paper backed transparency, respectively, the first and second adhesive configured to limit movement between the transparency and the paper backing and prevent the transparency and paper backing from separating during transport through the duplexing mechanism;

inverting the paper backed transparency in an imaging device; and imaging the bottom surface of the paper backing of the paper backed transparency, the paper backing entirely removable from the transparency side of the paper backed transparency.

16. The method of claim 15, wherein the adhesive on the trailing edge of the paper backed transparency is comprised of blocks only at the corners of the paper backed transparency.

17. The method of claim 15, wherein the adhesive on the trailing edge of the paper backed transparency is comprised of a solid adhesive strip.

18. The method of claim 15, wherein the adhesive on the trailing edge of the paper backed transparency is comprised of a dotted adhesive strip.

* * * * *